(12) United States Patent
Yamada (10) Patent No.: US 10,358,174 B2
(45) Date of Patent: Jul. 23, 2019

(54) WORKING VEHICLE

(71) Applicant: TADANO LTD., Kagawa (JP)

(72) Inventor: Takeshi Yamada, Kagawa (JP)

(73) Assignee: TADANO LTD., Kagawa (JP)

(*) Notice: Subject to any disclaimer, the term of this patent is extended or adjusted under 35 U.S.C. 154(b) by 236 days.

(21) Appl. No.: 15/550,138

(22) PCT Filed: Jan. 5, 2016

(86) PCT No.: PCT/JP2016/050145
§ 371 (c)(1),
(2) Date: Aug. 10, 2017

(87) PCT Pub. No.: WO2016/136279
PCT Pub. Date: Sep. 1, 2016

(65) Prior Publication Data
US 2018/0029850 A1   Feb. 1, 2018

(30) Foreign Application Priority Data
Feb. 27, 2015 (JP) .................. 2015-038254

(51) Int. Cl.
*B62D 33/063* (2006.01)
*B66C 13/54* (2006.01)
(Continued)

(52) U.S. Cl.
CPC .......... *B62D 33/0633* (2013.01); *B66C 13/54* (2013.01); *B66C 23/42* (2013.01); *E02F 9/166* (2013.01)

(58) Field of Classification Search
CPC .. B62D 33/06; B62D 33/0617; B62D 33/063; B62D 33/0633; B66C 13/54; E02F 9/166
(Continued)

(56) References Cited

U.S. PATENT DOCUMENTS 3,963,132 A * 6/1976 Dufour .............. B62D 33/0633
414/719
4,436,169 A * 3/1984 Jennerjohn ............. B66C 13/54
180/89.14

(Continued)

FOREIGN PATENT DOCUMENTS

| JP | 61-058271 U1 | 4/1986 |
|----|--------------|--------|
| JP | 2009040599 A * | 2/2009 |
| JP | 2014097881 A * | 5/2014 |

*Primary Examiner* — Jason S Daniels
(74) *Attorney, Agent, or Firm* — Paratus Law Group, PLLC (57) ABSTRACT

A working vehicle is provided with a traveling vehicle, a working section which is supported on a rotatable base, an operator's cab, and a connection section. The connection section includes: a connection section body which connects the rotatable base and the operator's cab and which is provided so as to be capable of pivoting about a base-side connection section connected to the rotatable base and about the operator's cab-side connection section connected to the operator's cab; and a pivot control section which extends so as to always intersect the connection section body in the range of pivoting of the connection section body, connects the rotatable base and the operator's cab, and is provided so as to be capable of pivoting about a base-side connection section connected to the rotatable base and about an operator's cab-side connection section connected to the operator's cab.

4 Claims, 5 Drawing Sheets

(51) Int. Cl.
*B66C 23/42* (2006.01)
*E02F 9/16* (2006.01)

(58) Field of Classification Search
USPC .......................... 296/190.01, 190.04, 190.05
See application file for complete search history.

(56) References Cited

U.S. PATENT DOCUMENTS

| | | | | |
|---|---|---|---|---|
| 5,865,264 A | * | 2/1999 | Glass | ................... B62D 33/063 180/89.13 |
| 2015/0225210 A1 | * | 8/2015 | Resch | ................... B62D 33/063 212/291 |

* cited by examiner

WORKING VEHICLE

CROSS REFERENCE TO PRIOR APPLICATION

This application is a National Stage Patent Application of PCT International Patent Application No. PCT/JP2016/050145 (filed on Jan. 5, 2016) under 35 U.S.C. § 371, which claims priority to Japanese Patent Application No. 2015/038254 (filed on Feb. 27, 2015), which are all hereby incorporated by reference in their entirety.

TECHNICAL FIELD

The present invention relates to a working vehicle. In particular, the present invention relates to a working vehicle including a cab for operating a travelling vehicle and a working part.

BACKGROUND ART

Conventionally, a working vehicle including a cab and a working part that are disposed on a slewing base provided on the upper side of a travelling vehicle is used. For example, a crane vehicle includes a slewing base that is turnable with respect to a travelling vehicle, and a cab and a crane part are disposed on the upper side of the slewing base. The crane part can be freely extended and contracted, and is contracted and laid along the travelling vehicle when the crane operation is completed. With this configuration, the travelling vehicle can stably travel.

Here, in general, a crane part is longer than a travelling vehicle, and, when the crane part is laid along the travelling vehicle, the end part of the crane part protrudes from the front part of the travelling vehicle. In view of this, disadvantageously, the end part of the crane part can possibly block the visibility of the operator operating in the cab when the crane vehicle travels on the road. For example, when the crane vehicle enters an intersection and the end part of the crane part is located between the cab and the signal, the operator in the cab cannot clearly check the traffic light in some situation.

In view of this, as a technique of maintaining the clear visibility of the operator in the cab during travel, PTL 1, for example, discloses a slewing excavator in which the cab is supported by a slewing arm such that the cab can be slewed to the rear part of the upper slewing body. When the slewing excavator travels on the road, the slewing excavator slews the cab to the rear side of the upper slewing body, and thus can prevent the working machine from blocking the visibility of the operator in the cab.

CITATION LIST

Patent Literature

PTL 1

Japanese Unexamined Utility Model Registration Application Publication No. 61-58271

SUMMARY OF INVENTION

Technical Problem

However, in the slewing excavator disclosed in PTL 1, the cab is turned along a large rotation radius around one support column that supports the slewing arm. In view of this, a large space is required to be provided around the cab to prevent the contact of the cab, and it is therefore difficult to efficiently utilize the space around the cab.

To solve the above-mentioned conventional problems, an object of the present invention is to provide a working vehicle which can efficiently utilize the space around the cab.

Solution to Problem

A working vehicle according to an embodiment of the present invention includes: a travelling vehicle; a working part that includes a slewing base turnably provided on an upper side of the travelling vehicle, and operates with a support of the slewing base; a cab mounted on the slewing base and configured for an operation of the travelling vehicle and the working part; and a coupling part that couples the cab and the slewing base such that an orientation of the cab is changeable with respect to the slewing base. the coupling part includes: a coupling part main body that couples the slewing base and the cab, and is turnable with a first base connecting part connected with the slewing base and a first cab connecting part connected with the cab, and a turning control part extended to intersect the coupling part main body at all times in a turning range of the coupling part main body and to couple the slewing base and the cab, the turning control part being turnable with a second base connecting part connected with the slewing base and a second cab connecting part connected with the cab, a distance between the first base connecting part of the coupling part main body and the second base connecting part of the turning control part and a distance between the first cab connecting part of the coupling part main body and the second cab connecting part of the turning control part are equal to each other, and a length from the first base connecting part to the first cab connecting part in the coupling part main body and a length from the second base connecting part to the second cab connecting part in the turning control part are equal to each other.

Here, preferably, the coupling part main body is connected with the cab at a portion in the proximity of a center of gravity of the cab to support the cab.

In addition, preferably, the coupling part main body is turned in a range of approximately 90 degrees.

In addition, the cab is disposed on a side of the working part, the cab including at one side part thereof a door through which an operator enters or leaves the cab; and when changing an orientation of the cab such that the door faces the working part, the coupling part can turn the cab to form a space of a passage for the operator between the door and the working part.

Advantageous Effects of Invention

According to the present invention, the orientation of the cab is changed with respect to the slewing base by the coupling part main body and the turning control part, and thus a working vehicle which can efficiently utilize the space around the cab can be provided.

DESCRIPTION OF EMBODIMENTS

An embodiment of the present invention is described below with reference to the accompanying drawings.

Figure 1:
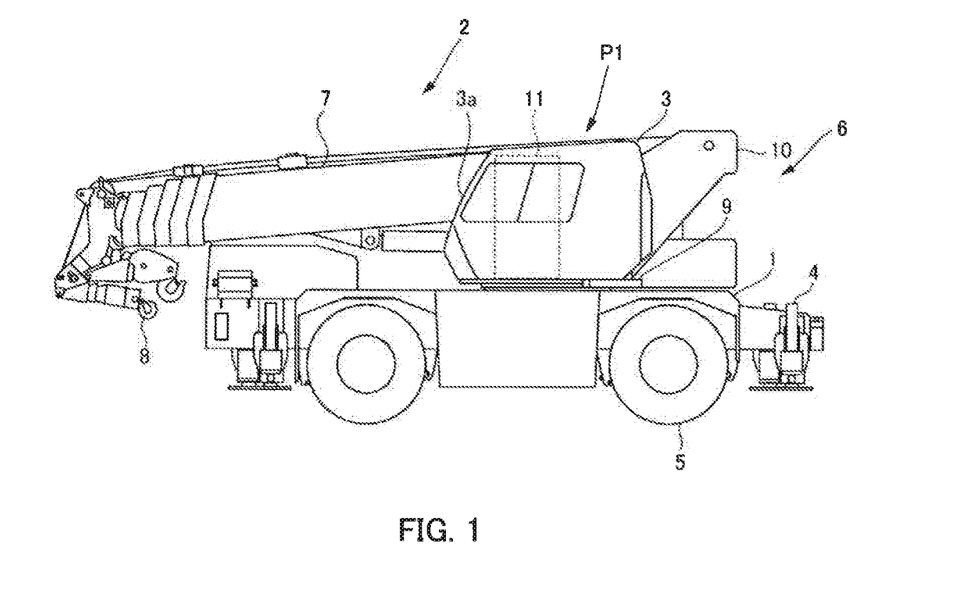
FIG. 1 is a side view illustrating a configuration of a working vehicle according to an embodiment of the present invention.

FIG. 1 illustrates a configuration of a working vehicle according to an embodiment of the present invention. This working vehicle is a crane vehicle including travelling vehicle 1, crane part 2 disposed on the upper side of travelling vehicle 1, and cab 3 disposed on the upper side of travelling vehicle 1.

Travelling vehicle 1 is configured to support crane part 2 and cab 3 and travel on a road and the like, and includes outrigger 4 and wheel 5.

Outrigger 4 is configured to support the position of the crane vehicle during a crane operation, and is provided at a front part of and a rear part of travelling vehicle 1. Outrigger 4 laterally overhangs from travelling vehicle 1, and the end part thereof is grounded to thereby support the crane vehicle.

Wheels 5 are provided between outriggers 4 disposed the front part and the rear part of travelling vehicle 1.

Crane part 2 is configured to perform a crane operation. Crane part 2 includes slewing base 6 that is turnably provided on the upper side of travelling vehicle 1, boom 7 that is mounted on slewing base 6 such that boom 7 can be raised and lowered, and hook 8 that is disposed at the leading end part of boom 7. Here, in FIG. 1, the reading end direction of boom 7 is the working direction, and the rear end direction of boom 7 is the travelling direction of travelling vehicle 1.

Slewing base 6 includes cab supporting part 9 disposed on the lower side of cab 3, and bracket 10 uprightly provided on a side of cab 3. Cab supporting part 9 has a flat plate shape, and is disposed to laterally overhang from the lower portion of bracket 10 to support the lower side of cab 3. Bracket 10 supports boom 7, and the rear end part of boom 7 is mounted thereto so as to be freely raised and lowered. Cab supporting part 9 and bracket 10 are provided to turn together on the upper side of travelling vehicle 1.

Boom 7 is extended from bracket 10 in the working direction and can be freely extended and contracted. Boom 7 has such a length that the leading end part protrudes from the rear part of travelling vehicle 1, that is, protrudes to the working direction side, when boom 7 is laid along the top surface travelling vehicle 1 in the shortest state.

Cab 3 is configured for operation of travelling vehicle 1 and crane part 2 by the operator, and is disposed on a side of crane part 2. Here, cab 3 is disposed in operation position P1 in which front part 3a is oriented to the working direction of crane part 2. In operation position P1, door 11 through which an operator enters or leaves cab 3 is provided at the right part of cab 3 that faces the side part of crane part 2.

Figure 2:
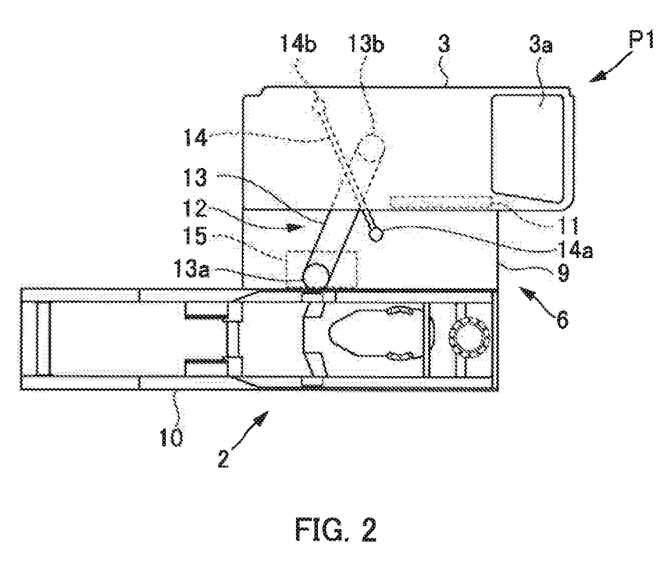
FIG. 2 is a top view illustrating a configuration of a coupling part that couples a cab and a slewing base.

FIG. 2 illustrates a top view of cab 3 and crane part 2. Here, FIG. 2 illustrates only main parts except for travelling vehicle 1, boom 7, and the like.

As illustrated in FIG. 2, cab 3 is coupled with cab supporting part 9 of slewing base 6 through coupling part 12. Coupling part 12 is disposed to extend on the lower side of cab 3, and couples cab 3 with cab supporting part 9 such that the orientation of cab 3 can be changed with respect to cab supporting part 9. To be more specific, coupling part 12 includes coupling part main body 13 laterally extended substantially along the top surface of cab supporting part 9 to couple cab supporting part 9 and cab 3, and turning control part 14 laterally extended to intersect coupling part main body 13 to couple cab supporting part 9 and cab 3.

Coupling part main body 13 is configured to turn cab 3 in the horizontal plane while supporting cab 3. Coupling part main body 13 has a large width, and includes base connecting part 13a turnably connected to the upper part of cab supporting part 9 at one end portion thereof, and cab connecting part 13b turnably connected to the bottom part of cab 3 at the other end portion thereof. Base connecting part 13a is disposed in the proximity of bracket 10 of slewing base 6, and cab connecting part 13b is disposed in the proximity of the center of gravity of cab 3. In this manner, with coupling part main body 13 disposed to laterally extend from a portion in the proximity of a side part of bracket 10, cab 3 is disposed at a position separated from the side part of bracket 10.

Turning control part 14 controls the turning of cab 3 with coupling part main body 13. Turning control part 14 includes base connecting part 14a turnably connected to the upper part of cab supporting part 9 at one end portion thereof, and cab connecting part 14b turnably connected to the bottom part of cab 3 at the other end portion thereof. Base connecting part 14a is disposed between cab 3 and bracket 10, and cab connecting part 14b is disposed in the proximity of a left side part of cab 3.

Base connecting part 14a and cab connecting part 14b are disposed at a position to sandwich coupling part main body 13 therebetween such that turning control part 14 intersects coupling part main body 13 at all times in a turning range of coupling part main body 13.

To be more specific, the parts are disposed such that the distance from base connecting part 14a to base connecting part 13a of coupling part main body 13, and the distance from cab connecting part 14b to cab connecting part 13b of coupling part main body 13 are equal to each other. Further, the parts are disposed such that the length from base connecting part 14a to cab connecting part 14b in turning control part 14 is equal to the length from base connecting part 13a to cab connecting part 13b in coupling part main body 13.

By disposing base connecting part 14a and cab connecting part 14b in the above-mentioned manner, turning control part 14 can be turned to follow the turning of coupling part main body 13. Here, coupling part main body 13 is turned by driving of turning driving part 15 disposed in cab supporting part 9.

Turning driving part 15 is connected with base connecting part 13a of coupling part main body 13 and an oil pressure circuit part not illustrated. Operation oil is supplied to turning driving part 15 from the oil pressure circuit part, and turning driving part 15 drives coupling part main body 13 to turn through base connecting part 13a.

Next, an operation of changing the orientation of cab 3 in association with the turning of coupling part 12 is described in detail.

Figure 3:
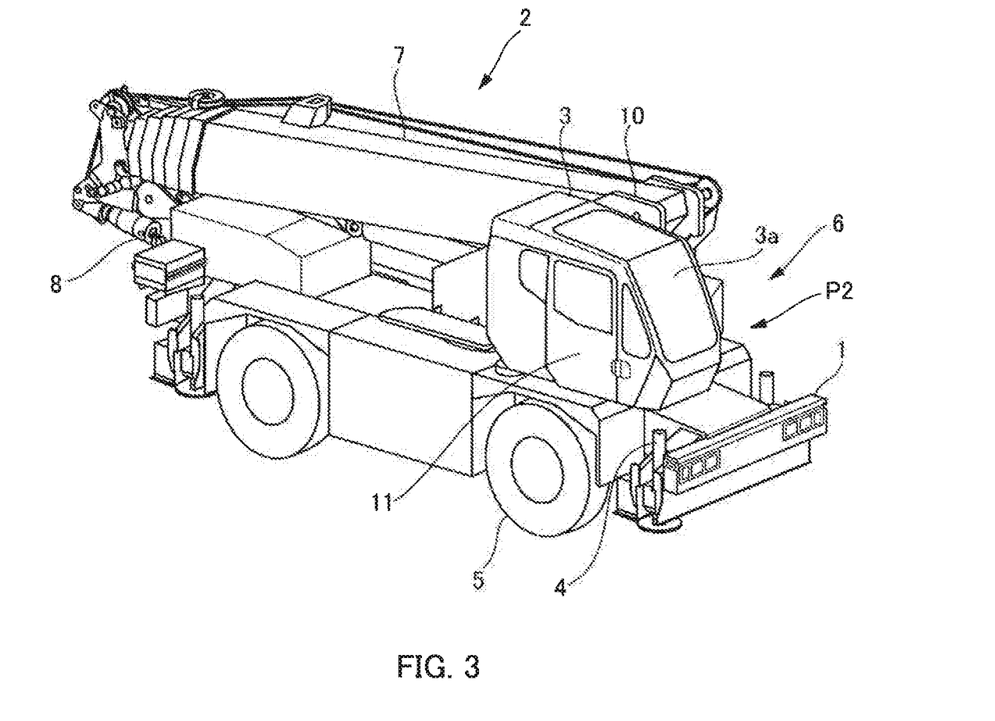
FIG. 3 is a perspective view illustrating a crane vehicle in which the cab is in a travelling position.

As illustrated in FIG. 3, cab 3 in operation position P1 is turned approximately 180 degrees into travelling position P2 in which front part 3a faces the travelling direction of travelling vehicle 1, that is, the rear end direction of boom 7.

Figure 4:
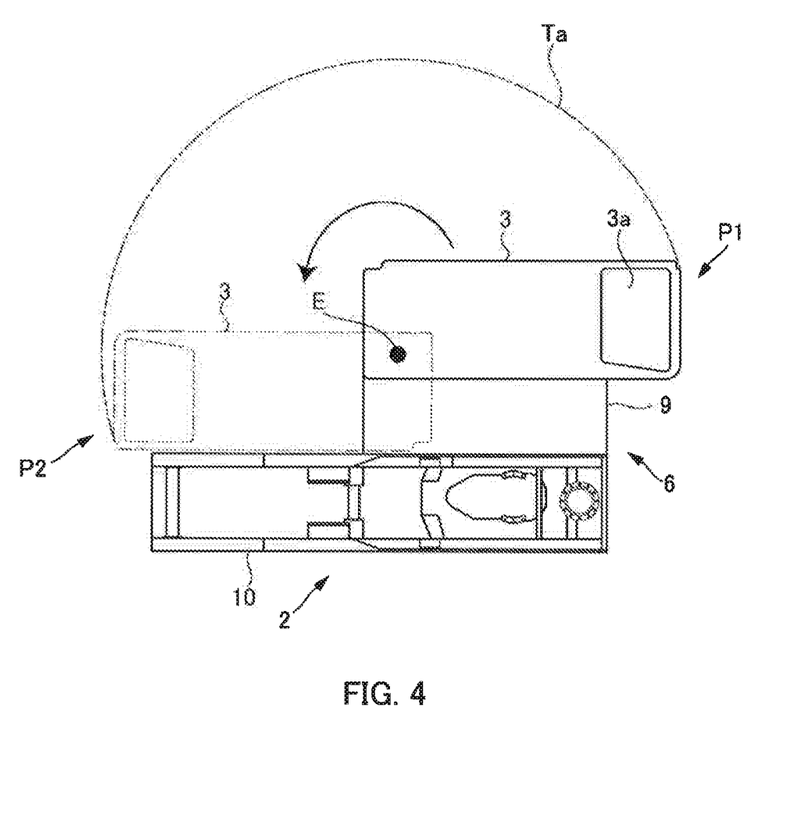
FIG. 4 illustrates a trajectory in the case where the cab is turned with the slewing base and the cab coupled with each other at one position.

At this time, in the case where cab 3 and cab supporting part 9 are turnably coupled with each other at one position with one coupling part E extending in the vertical direction as illustrated in FIG. 4, cab 3 is turned along trajectory Ta having a predetermined rotation radius along with the rotation of coupling part E around the axis of coupling part E.

Figure 5:
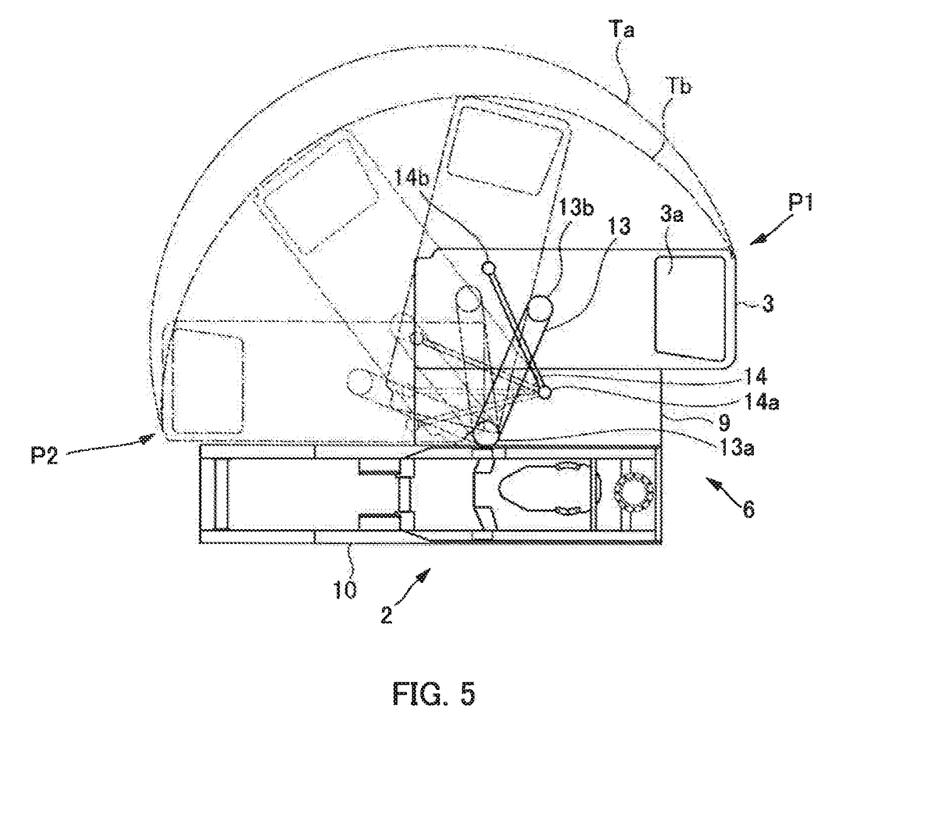
FIG. 5 illustrates a trajectory in the case where the cab is turned with the slowing base and the cab coupled with each other by a coupling part main body and a turning control part.

In contrast, in the case where cab supporting part 9 and cab 3 are turnably coupled with each other with coupling part main body 13 and turning control part 14 of coupling part 12 by an intersection link mechanism, cab connecting part 14b of turning control part 14 connected at a portion in the proximity of the left side part of cab 3 moves to approach base connecting part 13a of coupling part main body 13 along with the turning of coupling part main body 13 of cab 3 by coupling part main body 13 from operation position P1 to travelling position P2 as illustrated in FIG. 5. As a result, in travelling position P2, cab connecting part 14b is moved to a portion in the proximity of the intermediate portion between cab connecting part 13b and base connecting part 13a of coupling part main body 13.

In this manner, when cab connecting part 14b moves to approach base connecting part 13a of coupling part main body 13 along with the turning of coupling part main body 13, the left side part of cab 3 connected with cab connecting part 14b is immediately pulled toward bracket 10 side, and thus cab 3 can be turned along trajectory Tb having a small rotation radius. It is to be noted that, with the configuration in which turning control part 14 intersects coupling part main body 13 when cab 3 is set in travelling position P2, the intersecting state between turning control part 14 and coupling part main body 13 can be maintained at all times in a turning range of coupling part main body 13.

Next, an operation of the present embodiment is described.

First, cab 3 is set in operation position P1 as illustrated in FIG. 1, and a crane operation of crane part 2 is performed in the state where the crane vehicle is supported with outrigger 4. At this time, as illustrated in FIG. 2, coupling part main body 13 of coupling part 12 is laterally extended from a portion in the proximity of the side part of bracket 10 of crane part 2, and accordingly, cab 3 is disposed at a position separated from the side part of bracket 10.

In operation position P1, door 11 is provided at the right part of cab 3 that faces the side part of bracket 10, and, by disposing cab 3 at a position separated from bracket 10, the passage for the operator who enters or leaves cab 3 through door 11 can be provided. In addition, it is possible to prevent the side part of bracket 10 from blocking the visibility of the operator operating cab 3, and thus the operator can perform an operation of crane part 2 while clearly checking hook 8 mounted at the leading end of boom 7 from cab 3.

When the crane operation of crane part 2 is completed, boom 7 is contracted and laid along the top surface of travelling vehicle 1, and, outrigger 4 is housed in travelling vehicle 1. Here, the leading end part of boom 7 protrudes from the rear part of travelling vehicle 1, and therefore, if travelling vehicle 1 travels in the direction of the leading end of boom 7 with cab 3 set in operation position P1, the leading end part of boom 7 can possibly block the visibility of the operator operating in cab 3.

In view of this, as illustrated in FIG. 3, the orientation of cab 3 is changed from operation position P1 to travelling position P2. To be more specific, as illustrated in FIG. 5, turning driving part 15 rotates base connecting part 13a of coupling part main body 13 around the axis thereof, and thus coupling part main body 13 turns such that cab connecting part 13b moves to the rear part side of crane part 2. Along with the turning of coupling part main body 13, turning control part 14 disposed to intersect coupling part main body 13 is also turned, and cab connecting part 14b of turning control part 14 that is disposed at a portion in the proximity of the left side part of cab 3 in operation position P1 moves to approach base connecting part 13a of coupling part main body 13.

In this manner, when cab connecting part 14b of turning control part 14 moves to approach base connecting part 13a of coupling part main body 13 along with the turning of coupling part main body 13, the left side part of cab 3 connected with cab connecting part 14b is immediately pulled toward bracket 10 side, and thus cab 3 can be turned along trajectory Tb having a small rotation radius.

At this time, since cab connecting part 13b of coupling part main body 13 is disposed in the proximity of the center of gravity of cab 3, cab 3 can be surely supported, and the turning of cab 3 can be stably performed.

In this manner, when cab connecting part 14b of turning control part 14 is located in the proximity of base connecting part 13a of coupling part main body 13, the orientation of cab 3 is changed to travelling position P2 at 180 degrees to operation position P1. At this time, preferably, coupling part main body 13 turns in a range of approximately 90 degrees from operation position P1 to travelling position P2, and in this manner, the orientation of cab 3 can be surely changed from operation position P1 to travelling position P2.

When the orientation of cab 3 is changed to travelling position P2, travelling vehicle 1 travels in the rear end direction of boom 7 by the operation of the operator. At this time, the leading end part of boom 7 is located on the rear side of cab 3, and thus the clear visibility of the operator operating in cab 3 can be maintained.

Here, preferably, the orientation of cab 3 is changed by coupling part 12 such that front part 3a protrudes from the rear part of bracket 10 of crane part 2 as illustrated in FIG. 3. In this manner, by disposing front part of 3a of cab 3 to protrude from the rear part of bracket 10, the operator in cab 3 can operate travelling vehicle 1 while clearly checking the travelling direction of travelling vehicle 1.

According to the present embodiment, since cab 3 is turned with a small rotation radius with coupling part main body 13 and turning control part 14, it is not necessary to provide a large space for preventing contact of cab 3 at the time when the orientation of cab 3 is changed, and the space around cab 3 can be efficiently utilized.

While coupling part 12 is provided in a crane vehicle including crane part 2 in the above-mentioned embodiment, coupling part 12 can be provided any working vehicles including a working part that operates with support of slewing base 6. For example, coupling part 12 can be provided in an excavator and the like.

REFERENCE SIGNS LIST

1 Travelling vehicle
2 Crane part
3 Cab
3a Front part of cab
4 Outrigger
5 Wheel
6 Slewing base
7 Boom
8 Hook
9 Cab supporting part
10 Bracket
11 Door 12 Coupling part
13 Coupling part main body
13a Base connecting part
13b Cab connecting part
14 Turning control part
14a Base connecting part
14b Cab connecting part
15 Turning driving part
P1 Operation position
P2 Travelling position
Ta, Tb Trajectory of cab
E Coupling part

The invention claimed is:

1. A working vehicle comprising:
a travelling vehicle;
a working part that includes a slewing base turnably provided on an upper side of the travelling vehicle, and operates with a support of the slewing base;
a cab mounted on the slewing base and configured for an operation of the travelling vehicle and the working part; and
a coupling part that couples the cab and the slewing base such that an orientation of the cab is changeable with respect to the slewing base, wherein:
the coupling part includes:
a coupling part main body that couples the slewing base and the cab, and is turnable with a first base connecting part connected with the slewing base and a first cab connecting part connected with the cab, and
a turning control part extended to intersect the coupling part main body at all times in a turning range of the coupling part main body and to couple the slewing base and the cab, the turning control part being turnable with a second base connecting part connected with the slewing base and a second cab connecting part connected with the cab,
a distance between the first base connecting part of the coupling part main body and the second base connecting part of the turning control part and a distance between the first cab connecting part of the coupling part main body and the second cab connecting part of the turning control part are equal to each other, and
a length from the first base connecting part to the first cab connecting part in the coupling part main body and a length from the second base connecting part to the second cab connecting part in the turning control part are equal to each other.

2. The working vehicle according to claim 1, wherein the coupling part main body is connected with the cab at a portion in the proximity of a center of gravity of the cab to support the cab.

3. The working vehicle according to claim 1, wherein the coupling part main body is turned in a range of approximately 90 degrees.

4. The working vehicle according to claim 1, wherein:
the cab is disposed on a side of the working part, the cab including at one side part thereof a door through which an operator enters or leaves the cab; and
when changing an orientation of the cab such that the door faces the working part, the coupling part turns the cab to form a space between the door and the working part as a passage for the operator.

* * * * *